(12) United States Patent
Shuto et al.

(10) Patent No.: US 10,894,800 B2
(45) Date of Patent: Jan. 19, 2021

(54) POLYMERIZABLE SILANE COMPOUND

(71) Applicant: NISSAN CHEMICAL CORPORATION, Tokyo (JP)

(72) Inventors: Keisuke Shuto, Funabashi (JP); Taku Kato, Funabashi (JP); Takehiro Nagasawa, Funabashi (JP)

(73) Assignee: NISSAN CHEMICAL CORPORATION, Tokyo (JP)

( * ) Notice: Subject to any disclaimer, the term of this patent is extended or adjusted under 35 U.S.C. 154(b) by 105 days.

(21) Appl. No.: 16/305,342

(22) PCT Filed: May 9, 2017

(86) PCT No.: PCT/JP2017/017582
§ 371 (c)(1),
(2) Date: Nov. 28, 2018

(87) PCT Pub. No.: WO2017/208748
PCT Pub. Date: Dec. 7, 2017

(65) Prior Publication Data
US 2019/0256533 A1    Aug. 22, 2019

(30) Foreign Application Priority Data

May 30, 2016  (JP) ................................ 2016-107985

(51) Int. Cl.
*C07F 7/18* (2006.01)
*C08G 77/20* (2006.01)
*C08G 77/00* (2006.01)

(52) U.S. Cl.
CPC .............. *C07F 7/1804* (2013.01); *C07F 7/18* (2013.01); *C08G 77/20* (2013.01); *C08G 77/70* (2013.01); *C08G 77/80* (2013.01)

(58) Field of Classification Search
None
See application file for complete search history.

(56) References Cited

U.S. PATENT DOCUMENTS

| | | | | | |
|---|---|---|---|---|---|
| 3,427,273 | A | * | 2/1969 | Newing, Jr. ........... | C09K 11/06 524/806 |
| 6,949,616 | B2 | * | 9/2005 | Jacob ..................... | B01D 71/70 524/588 |

(Continued)

FOREIGN PATENT DOCUMENTS

| JP | 2010-97194 A | 4/2010 |
|---|---|---|
| JP | 2013-133315 A | 7/2013 |

(Continued)

OTHER PUBLICATIONS

Jul. 4, 2017 International Search Report issued International Patent Application No. PCT/JP2017/017582.

(Continued)

*Primary Examiner* — Robert S Loewe
(74) *Attorney, Agent, or Firm* — Oliff PLC

(57) ABSTRACT

A polymerizable silane compound that yields a cured product exhibiting a high refractive index and a low Abbe number, used in a polymerizable composition for preparing a molded article having higher transparency. A polysiloxane being a polycondensation product of the compound of formula [1]:

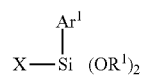

[1]

(wherein X is a phenyl group having at least one substituent having a polymerizable double bond, a naphthyl group having at least one substituent having a polymerizable double bond, a biphenyl group having at least one substituent having a polymerizable double bond, or a phenanthryl group having at least one group having a polymerizable (Continued)

double bond, $Ar^1$ is a condensed polycyclic hydrocarbon group (optionally substituted with a $C_{1-6}$ alkyl group), or a hydrocarbon ring assembly group wherein two or more aromatic rings are directly bonded through a single bond (optionally substituted with a $C_{1-6}$ alkyl group), and $R^1$ is a methyl, ethyl, or isopropyl group).

4 Claims, 1 Drawing Sheet

(56) References Cited

U.S. PATENT DOCUMENTS

| | | | | |
|---|---|---|---|---|
| 6,984,747 B2* | 1/2006 | Jacob | ................... | C07F 7/1876 |
| | | | | 556/466 |
| 9,012,673 B1* | 4/2015 | Mabry | ................. | C08G 77/045 |
| | | | | 556/461 |
| 2003/0216537 A1* | 11/2003 | Friedrich | .............. | C08G 77/04 |
| | | | | 528/24 |
| 2003/0232951 A1* | 12/2003 | Friedrich | ................. | C07F 7/21 |
| | | | | 528/32 |
| 2005/0032357 A1* | 2/2005 | Rantala | ............ | H01L 21/02126 |
| | | | | 438/637 |
| 2005/0244658 A1* | 11/2005 | Bae | ....................... | C08G 77/14 |
| | | | | 428/447 |
| 2007/0225466 A1* | 9/2007 | Matsumoto | ............. | C08L 83/14 |
| | | | | 528/25 |
| 2009/0246716 A1* | 10/2009 | Kathaperumal | ...... | G03F 7/0005 |
| | | | | 430/325 |
| 2010/0019399 A1* | 1/2010 | Kimura | ................. | C08F 283/12 |
| | | | | 257/791 |
| 2010/0123259 A1* | 5/2010 | Yorisue | ................ | C08F 283/12 |
| | | | | 257/791 |
| 2010/0209669 A1* | 8/2010 | Aoai | .................... | C08F 283/122 |
| | | | | 428/156 |
| 2011/0207049 A1* | 8/2011 | Tillema | .................. | C08G 77/14 |
| | | | | 430/270.1 |
| 2011/0230584 A1* | 9/2011 | Araki | ................. | C08F 290/148 |
| | | | | 522/99 |
| 2014/0051821 A1* | 2/2014 | Popall | .................... | C08G 77/20 |
| | | | | 528/26 |
| 2015/0252221 A1* | 9/2015 | Iimura | ................. | C09D 183/04 |
| | | | | 524/588 |
| 2015/0344636 A1* | 12/2015 | Iimura | ................... | C08G 77/14 |
| | | | | 257/791 |
| 2016/0252816 A1* | 9/2016 | Mikami | ........... | B29D 11/00663 |
| | | | | 430/321 |
| 2018/0079849 A1* | 3/2018 | Nagasawa | ................ | C08F 2/44 |
| 2019/0256664 A1 | 8/2019 | Nagasawa et al. | | |

FOREIGN PATENT DOCUMENTS

| | | |
|---|---|---|
| JP | 2014-129477 A | 7/2014 |
| WO | 03/097719 A1 | 11/2003 |
| WO | 2015/159972 A1 | 10/2015 |
| WO | WO2017/208936 A1 | 3/2019 |

OTHER PUBLICATIONS

Jul. 4, 2017 Written Opinion of the International Searching Authority issued in International Patent Application No. PCT/JP2017/017582.

* cited by examiner

POLYMERIZABLE SILANE COMPOUND

TECHNICAL FIELD

The present invention relates to a polymerizable silane compound. Specifically, the present invention relates to a polymerizable silane compound that can form a cured product having excellent optical properties (transparency, low Abbe number, and high refractive index).

BACKGROUND ART

Resin lenses are used in electronic devices such as mobile phones, digital cameras, and vehicle-mounted cameras and required to have excellent optical properties in accordance with the purpose of each electronic device. The resin lenses are also required to have high durability, for example, heat resistance and weather resistance, and productivity that permits molding at high yields, in accordance with the mode of use. For example, thermoplastic transparent resins such as polycarbonate resins, cycloolefin polymers, and methacrylic resins have been employed as materials for resin lenses that satisfy these requirements.

A plurality of lenses are used in high-resolution camera modules. Among these lenses, one wavelength correction lens is required to be made of an optical material having a high refractive index and a low Abbe number. For the production of resin lenses, a shift from the injection molding of thermoplastic resins to molding at the wafer level molding by compression molding using curable resins that are liquid at room temperature has been actively studied in order to improve yields or production efficiency and furthermore, suppress optical axis displacement at the time of lens lamination.

A composition containing an organic sulfur compound (see, for example, Patent Document 1) and an organic-inorganic complex with titanium oxide are known as conventional materials characterized by a high refractive index and a low Abbe number. However, problems of the former material are odor derived from free sulfur and a low light transmittance of a cured product (molded article) ascribable to coloring, while problems of the latter material are white turbidity ascribable to the aggregation of inorganic fine particles and a fragile cured product. Thus, these materials are difficult to apply to actual processes.

PRIOR ART DOCUMENTS

Patent Document

Patent Document 1: Japanese Patent Application Publication No. 2010-97194 (JP 2010-97194 A)

SUMMARY OF THE INVENTION

Problem to be Solved by the Invention

Accordingly, there has not yet been any curable resin material that can be used as a lens for high-resolution camera modules, has a high refractive index (e.g., 1.7 or more) and a low Abbe number (e.g., 23 or less), and satisfies high transparency. Thus, the development thereof has been demanded.

The present invention has been made in light of these circumstances. An object of the present invention is to provide a novel polymerizable silane compound that yields a cured product exhibiting a high refractive index and a low Abbe number and is used in a polymerizable composition suitable for preparing a molded article having higher transparency.

Means for Solving the Problem

The present inventors have conducted diligent studies to attain the object and consequently completed the present invention by finding that a specific silane compound having: an aromatic ring group having a polymerizable double bond; and a condensed ring hydrocarbon group having two or more benzene ring structures, or a hydrocarbon ring assembly group in which two or more aromatic rings are directly bonded through a single bond exerts a low Abbe number (e.g., 23 or less) and a high refractive index (e.g., 1.7 or more) and exhibits high transparency of 90% or more in a cured product (molded article) thereof. Hereinafter, in the present specification, the condensed ring hydrocarbon group having two or more benzene ring structures is referred to as a condensed polycyclic hydrocarbon group.

Specifically, in the first aspect, the present invention relates to a polymerizable silane compound of formula [1]:

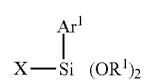

[1]

(wherein X is a phenyl group having at least one substituent having a polymerizable double bond, a naphthyl group having at least one substituent having a polymerizable double bond, a biphenyl group having at least one substituent having a polymerizable double bond, or a phenanthryl group having at least one group having a polymerizable double bond, $Ar^1$ is a condensed polycyclic hydrocarbon group (optionally substituted with a $C_{1-6}$ alkyl group), or a hydrocarbon ring assembly group in which two or more aromatic rings are directly bonded through a single bond (optionally substituted with a $C_{1-6}$ alkyl group), and $R^1$ is a methyl group, an ethyl group, or an isopropyl group).

In the second aspect, the present invention relates to the polymerizable silane compound according to the first aspect, wherein the X is a vinylphenyl group.

In the third aspect, the present invention relates to the polymerizable silane compound according to the first or second aspect, wherein the $Ar^1$ is a condensed polycyclic hydrocarbon group.

In the fourth aspect, the present invention relates to the polymerizable silane compound according to the third aspect, wherein the $Ar^1$ is a phenanthryl group.

In the fifth aspect, the present invention relates to a polysiloxane being a polycondensation product of a polymerizable silane compound according to any one of the first to fourth aspects.

In the sixth aspect, the present invention relates to a polysiloxane being a copolycondensation product of a polymerizable silane compound according to any one of the first to fourth aspects with an alkoxysilane compound different from the polymerizable silane compound.

In the seventh aspect, the present invention relates to a polysiloxane being a copolycondensation product of a polymerizable silane compound according to any one of the first to fourth aspects with an aromatic silane compound of formula [2]:

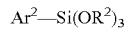

[2]

(wherein Ar is a condensed polycyclic hydrocarbon group (optionally substituted with a $C_{1-6}$ alkyl group), or a hydrocarbon ring assembly group in which two or more aromatic rings are directly bonded through a single bond (optionally substituted with a $C_{1-6}$ alkyl group), and $R^2$ is a methyl group, an ethyl group, or an isopropyl group).

In the eighth aspect, the present invention relates to the polysiloxane according to the seventh aspect, wherein the $Ar^2$ is a phenanthryl group.

Effects of the Invention

The polymerizable silane compound of the present invention can achieve optical properties desirable for an optical device, for example, a lens for high-resolution camera modules, i.e., a high transmittance of 90% or more, a low Abbe number of 23 or less, and a high refractive index of 1.7 or more, in a cured product thereof.

Thus, the polymerizable silane compound of the present invention can be suitably used as a material intended for various optical devices, particularly, a material for lenses for high-resolution camera modules.

MODES FOR CARRYING OUT THE INVENTION

[Polymerizable Silane Compound]

Figure 1:
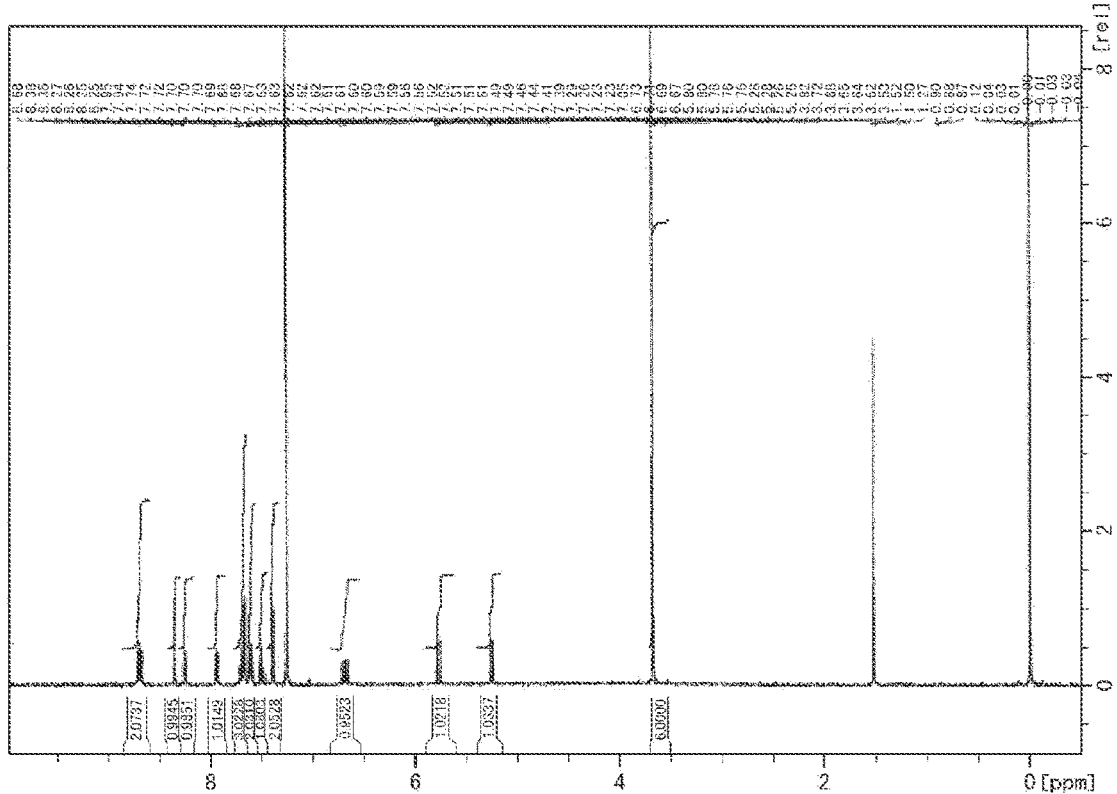
FIG. 1 is a diagram showing the $^1H$ NMR spectrum of dimethoxy(phenanthren-9-yl)(4-vinylphenyl)silane obtained in Example 1.

The polymerizable silane compound of the present invention is a compound of the following formula [1]:

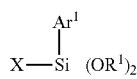

[1]

In formula [1] described above, X is a phenyl group having at least one substituent having a polymerizable double bond, a naphthyl group having at least one substituent having a polymerizable double bond, a biphenyl group having at least one substituent having a polymerizable double bond, or a phenanthryl group having at least one substituent having a polymerizable double bond, $Ar^1$ is a condensed polycyclic hydrocarbon group (optionally substituted with a $C_{1-6}$ alkyl group), or a hydrocarbon ring assembly group in which two or more aromatic rings are directly bonded through a single bond (optionally substituted with a $C_{1-6}$ alkyl group), and $R^1$ is a methyl group, an ethyl group, or an isopropyl group.

Examples of the phenyl group having at least one group having a polymerizable double bond as X include a 2-vinylphenyl group, a 3-vinylphenyl group, a 4-vinylphenyl group, a 4-vinyloxyphenyl group, a 4-allylphenyl group, a 4-allyloxyphenyl group, and a 4-isopropenylphenyl group.

Examples of the naphthyl group having at least one group having a polymerizable double bond as X include a 4-vinylnaphthalen-1-yl group, a 5-vinylnaphthalen-1-yl group, a 6-vinylnaphthalen-2-yl group, a 5-vinyloxynaphthalen-1-yl group, a 5-allylnaphthalen-1-yl group, a 4-allyloxynaphthalen-1-yl group, a 5-allyloxynaphthalen-1-yl group, a 8-allyloxynaphthalen-1-yl group, and a 5-isopropenylnaphthalen-1-yl group.

Examples of the biphenyl group having at least one group having a polymerizable double bond as X include a 4'-vinyl-[1,1'-biphenyl]-2-yl group, a 4'-vinyl-[1,1'-biphenyl]-3-yl group, a 4'-vinyl-[1,1'-biphenyl]-4-yl group, a 4'-vinyloxy-[1,1'-biphenyl]-4-yl group, a 4'-allyl-[1,1'-biphenyl]-4-yl group, a 4'-allyloxy-[1,1'-biphenyl]-4-yl group, and a 4'-isopropenyl-[1,1'-biphenyl]-4-yl group.

Examples of the phenanthryl group having at least one group having a polymerizable double bond as X include a 3-vinylphenanthren-9-yl group, a 7-vinylphenanthren-9-yl group, a 10-vinylphenanthren-9-yl group, a 7-vinylphenanthren-2-yl group, a 6-vinylphenanthren-3-yl group, a 10-vinylphenanthren-3-yl group, a 3-vinyloxyphenanthren-9-yl group, a 3-allylphenanthren-9-yl group, a 3-allyloxyphenanthren-9-yl group, and a 3-isopropenylphenanthren-9-yl group.

Among others, the X is preferably a phenyl group having at least one group having a polymerizable double bond, more preferably a vinylphenyl group.

Examples of the condensed polycyclic hydrocarbon group as $Ar^1$ include monovalent groups derived from naphthalene, phenanthrene, anthracene, triphenylene, pyrene, chrysene, naphthacene, biphenylene, and fluorene.

Examples of the hydrocarbon ring assembly group in which two or more aromatic rings are directly bonded through a single bond include monovalent groups derived from biphenyl, terphenyl, quaterphenyl, binaphthalene, phenylnaphthalene, phenylfluorene, and diphenylfluorene.

Examples of the $C_{1-6}$ alkyl group optionally present as a substituent on the condensed polycyclic hydrocarbon group and the hydrocarbon ring assembly group include a methyl group, an ethyl group, a n-propyl group, an isopropyl group, a n-butyl group, an isobutyl group, a sec-butyl group, a tert-butyl group, a n-pentyl group, a cyclopentyl group, a n-hexyl group, and a cyclohexyl group.

Among others, the $Ar^1$ is preferably a condensed polycyclic hydrocarbon group (optionally substituted with a $C_{1-6}$ alkyl group), more preferably a phenanthryl group.

Specific examples of the compound of formula [1] include, but are not limited to, dimethoxy(9-phenanthryl)(4-vinylphenyl)silane, diethoxy(9-phenanthryl)(4-vinylphenyl)silane, diisopropoxy(9-phenanthryl)(4-vinylphenyl)silane, dimethoxy(9-phenanthryl)(4-vinylnaphthalen-1-yl)silane, dimethoxy(9-phenanthryl)(4'-vinyl-[1,1'-biphenyl]-4-yl)silane, dimethoxy(9-phenanthryl)(3-vinylphenanthren-9-yl)silane, dimethoxy(1-naphthyl)(4-vinylphenyl)silane, dimethoxy(2-naphthyl)(4-vinylphenyl)silane, dimethoxy(2-phenanthryl)(4-vinylphenyl)silane, dimethoxy(3-phenanthryl)(4-vinylphenyl)silane, dimethoxy(9-phenanthryl)(4-vinylphenyl)silane, and [1,1'-biphenyl]-4-yldimethoxy(4-vinylphenyl)silane.

The polymerizable silane compound of the present invention can be produced by a routine method and may be produced, for example, through conventional Grignard reaction of reacting an alkoxysilane compound with a Grignard reagent to obtain an organoalkoxysilane compound, or through conventional coupling reaction of reacting an alkoxyhydrosilane compound with an aryl halide by use of a transition metal catalyst to obtain an organoalkoxysilane compound.

Specifically, the polymerizable silane compound of formula [1] can be obtained by reacting a Grignard reagent having an $Ar^1$ group: $Ar^1$—Mg-Hal with a trialkoxysilane compound having an aromatic ring group having a polymerizable double bond: X—Si(OR$^1$)$_3$, or by reacting a Grignard reagent having an aromatic ring group having a polymerizable double bond: X—Mg-Hal with a trialkoxysilane compound having Ar$^1$ group: Ar$^1$—Si(OR$^1$)$_3$ (the Ar$^1$, the X, and the R$^1$ are as defined in the formula [1], and Hal is a halogen atom).

The Grignard reagent is obtained through the reaction of an aryl halide: Ar$^1$—Hal or X-Hal with magnesium.

The production of the Grignard reagent and the reaction of the Grignard reagent with the alkoxysilane compound can be carried out in an organic solvent. In this context, examples of the organic solvent used can include inert organic solvents including: ether solvents such as diethyl ether, tetrahydrofuran, and tert-butyl methyl ether; and hydrocarbon solvents such as hexane, toluene, and xylene. These organic solvents may be used alone or as a mixture of two or more thereof.

The production temperature and the reaction temperature are preferably in the range of 0 to 200° C., particularly, 20 to 150° C.

If oxygen is present during the production of the Grignard reagent or in the reaction system of the Grignard reagent and the alkoxysilane compound, the Grignard reagent reacts with the oxygen in the production or reaction process, causing reduction in the yield of the polymerizable silane compound of interest. Therefore, these processes are preferably performed in an inert atmosphere such as a nitrogen or argon atmosphere.

After the completion of reaction, preferably, the obtained polymerizable silane compound is recovered by an arbitrary method such as filtration or solvent removal by distillation and appropriately subjected to purification treatment such as recrystallization, distillation, or column chromatography in accordance with the need. For the purpose of removing impurities such as coloring components or metals, the obtained polymerizable silane compound may be dissolved in an inert organic solvent and then contacted with, for example, a cation-exchange resin, an anion-exchange resin, a scavenger, active carbon, a silica gel, or a metal adsorbent for a necessary time.

[Polysiloxane]

The present invention is also directed to a polysiloxane. Specifically, the present invention is also directed to a polysiloxane being a polycondensation product of the polymerizable silane compound of formula [1], and a polysiloxane being a copolycondensation product of the polymerizable silane compound of formula [1] with an alkoxy silicon compound different from the polymerizable silane compound of formula [1]. The alkoxy silicon compound different from the polymerizable silane compound of formula [1] is not particularly limited. In a preferred aspect, examples thereof include an aromatic silane compound of formula [2] mentioned later.

Hereinafter, in the present specification, the terms "polycondensation" and "copolycondensation" are also simply referred to as "polycondensation" together.

<Aromatic Silane Compound>

The aromatic silane compound is a compound of the following formula [2]:

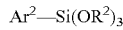
$$Ar^2\text{—}Si(OR^2)_3 \qquad [2]$$

In formula [2] described above, Ar$^2$ is a condensed polycyclic hydrocarbon group (optionally substituted with a C$_{1-6}$ alkyl group), or a hydrocarbon ring assembly group in which two or more aromatic rings are directly bonded through a single bond (optionally substituted with a C$_{1-6}$ alkyl group), and R$^2$ is a methyl group, an ethyl group, or an isopropyl group.

Examples of the condensed polycyclic hydrocarbon group (optionally substituted with a C$_{1-6}$ alkyl group) as Ar$^2$ include monovalent groups derived from naphthalene, phenanthrene, anthracene, triphenylene, pyrene, chrysene, naphthacene, biphenylene, and fluorene.

Examples of the hydrocarbon ring assembly group in which two or more aromatic rings are directly bonded through a single bond include monovalent groups derived from biphenyl, terphenyl, quaterphenyl, binaphthalene, phenylnaphthalene, phenylfluorene, and diphenylfluorene.

Examples of the C$_{1-6}$ alkyl group optionally present as a substituent on the condensed polycyclic hydrocarbon group and the hydrocarbon ring assembly group include a methyl group, an ethyl group, a n-propyl group, an isopropyl group, a n-butyl group, an isobutyl group, a sec-butyl group, a tert-butyl group, a n-pentyl group, a cyclopentyl group, a n-hexyl group, and a cyclohexyl group.

Among others, the Ar$^2$ is preferably a condensed polycyclic hydrocarbon group (optionally substituted with a C$_{1-6}$ alkyl group), more preferably a phenanthryl group.

Specific examples of the compound of formula [2] include, but are not limited to, trimethoxy(1-naphthyl)silane, triethoxy(1-naphthyl)silane, triisopropoxy(1-naphthyl)silane, trimethoxy(2-naphthyl)silane, triethoxy(2-naphthyl)silane, triisopropoxy(2-naphthyl)silane, trimethoxy(2-phenanthryl)silane, trimethoxy(3-phenanthryl)silane, trimethoxy(9-phenanthryl)silane, triethoxy(9-phenanthryl)silane, triisopropoxy(9-phenanthryl)silane, [1,1'-biphenyl]-4-yltrimethoxysilane, [1,1'-biphenyl]-4-yltriethoxysilane, and [1,1'-biphenyl]-4-yltriisopropoxysilane.

<Mixing Ratio Between Polymerizable Silane Compound and Alkoxy Silicon Compound Different Therefrom>

When the polysiloxane according to the present invention comprises the polymerizable silane compound of formula [1] as well as the alkoxy silicon compound different therefrom, for example, the aromatic silane compound of formula [2], the molar mixing ratio required for the polycondensation reaction of these alkoxy silicon compounds is not particularly limited and is usually preferably in the range of 9 mol or less of the aromatic silane compound with respect to one mol of the polymerizable silane compound of formula [1], for the purpose of stabilizing the physical properties of a cured product, and more preferably in the range of 1.5 mol or less. When the molar mixing ratio of the aromatic silane compound to the number of moles of the polymerizable silane compound is 9 or less, a sufficient cross-linking density is obtained, and dimensional stability against heat is further improved. In addition, a cured product having a higher refractive index and a lower Abbe number can be obtained.

The polymerizable silane compound or the aromatic silane compound mentioned above can be appropriately selected and used from the compounds in accordance with the need. A plurality of compounds may be used in combination as the polymerizable silane compound or the aromatic silane compound. In this case, the molar mixing ratio also falls within the range described above in terms of the ratio between the total molar quantity of the polymerizable silane compounds and the total molar quantity of the aromatic silane compounds.

<Acidic or Basic Catalyst>

The polycondensation reaction of the polymerizable silane compound of formula [1], or the polycondensation reaction of the polymerizable silane compound of formula

[1] with the alkoxy silicon compound different therefrom, particularly, the aromatic silane compound of formula [2], is suitably carried out in the presence of an acidic or basic catalyst.

The catalyst for use in the polycondensation reaction is not particularly limited by its type as long as the catalyst is dissolved or uniformly dispersed in a solvent mentioned later. The catalyst can be appropriately selected and used in accordance with the need.

Examples of the catalyst that can be used include: inorganic acids such as hydrochloric acid, nitric acid, and sulfuric acid, and organic acids such as acetic acid and oxalic acid, as acidic compounds; alkali metal hydroxides, alkaline earth metal hydroxides, ammonium hydroxide, quaternary ammonium salts, and amines as basic compounds; and $NH_4F$ and $NR_4F$ as fluorides. In this context, R is one or more groups selected from the group consisting of a hydrogen atom, a linear alkyl group having a carbon atom number of 1 to 12, a branched alkyl group having a carbon atom number of 3 to 12, and a cyclic alkyl group having a carbon atom number of 3 to 12.

These catalysts can be used alone or in combination of two or more thereof.

Examples of the acidic compound include hydrochloric acid, nitric acid, sulfuric acid, acetic acid, oxalic acid, and boric acid.

Examples of the basic compound include sodium hydroxide, potassium hydroxide, magnesium hydroxide, calcium hydroxide, strontium hydroxide, barium hydroxide, ammonium hydroxide, tetramethylammonium hydroxide, tetraethylammonium hydroxide, tetrabutylammonium hydroxide, and triethylamine.

Examples of the fluoride can include ammonium fluoride, tetramethylammonium fluoride, and tetrabutylammonium fluoride.

Among these catalysts, one or more selected from the group consisting of hydrochloric acid, acetic acid, potassium hydroxide, calcium hydroxide, barium hydroxide, and tetraethylammonium hydroxide are preferably used.

The amount of the catalyst used is 0.01 to 10% by mass, preferably 0.1 to 5% by mass, with respect to the total mass of the alkoxy silicon compounds in accordance with the polycondensation reaction, i.e., the polymerizable silane compound of formula [1] and the alkoxy silicon compound different therefrom, for example, the aromatic silane compound of formula [2]. When the amount of the catalyst used is set to 0.01% by mass or more, the reaction proceeds more favorably. Use of the catalyst at 10% by mass or less suffices in consideration of cost efficiency.

<Polycondensation Reaction>

A feature of the polysiloxane (polycondensation product) according to the present invention is the structure of the polymerizable silane compound of formula [1]. The reactive group (polymerizable double bond) contained in the polymerizable silane compound is easily polymerized by a radical or a cation and is capable of contributing to the heat resistance of a cured product after polymerization (after curing).

The hydrolytic polycondensation reaction of the polymerizable silane compound of formula [1], and the hydrolytic polycondensation reaction of the polymerizable silane compound with the alkoxy silicon compound different therefrom or, in a preferred aspect, the aromatic silane compound of formula [2], may be performed in the absence of a solvent. Alternatively, a solvent, such as tetrahydrofuran (THF), mentioned later which is inert to alkoxy silicon compounds, for example, the polymerizable silane compound described above, may be used as a reaction solvent. Use of such a reaction solvent has the advantages that the reaction system becomes easily homogeneous; and that more stable polycondensation reaction is performed.

The synthesis reaction of the polysiloxane may be performed in the absence of a solvent, as mentioned above. However, a solvent can be used for more homogeneous reaction without any problem. The solvent is not particularly limited as long as the solvent does not react with the silane compound and dissolves a polycondensation product thereof.

Examples of such a reaction solvent include: ketones such as acetone and methyl ethyl ketone (MEK); aromatic hydrocarbons such as benzene, toluene, and xylene; ethers such as tetrahydrofuran (THF), 1,4-dioxane, diisopropyl ether, and cyclopentyl methyl ether (CPME); glycols such as ethylene glycol, propylene glycol, and hexylene glycol; glycol ethers such as ethyl cellosolve, butyl cellosolve, ethyl carbitol, butyl carbitol, diethyl cellosolve, and diethyl carbitol; and amides such as N-methyl-2-pyrrolidone (NMP) and N,N-dimethylformamide (DMF). These solvents may be used alone or as a mixture of two or more thereof.

The polysiloxane according to the present invention is obtained by performing the hydrolytic polycondensation of the polymerizable silane compound of formula [1], or of the polymerizable silane compound of formula [1] with the alkoxy silicon compound different therefrom, particularly, the aromatic silane compound of formula [2], in the presence of the acidic or basic catalyst mentioned above. The reaction temperature required for the hydrolytic polycondensation is 20 to 150° C., more preferably 30 to 120° C.

The reaction time is not particularly limited as long as the reaction time is equal to or longer than the time required for completing increase in the molecular weight of the polycondensation product and stabilizing a molecular weight distribution. More specifically, the reaction time is several hours to several days.

After the completion of polycondensation reaction, preferably, the obtained polysiloxane is recovered by an arbitrary method such as filtration or solvent removal by distillation and appropriately subjected to purification treatment in accordance with the need.

One example of the process for producing the polysiloxane according to the present invention includes a process comprising polycondensing the polymerizable silane compound of formula [1], or the polymerizable silane compound of formula [1] with the alkoxy silicon compound different therefrom, particularly, the aromatic silane compound of formula [2], in the presence of a base, and removing the base using a cation-exchange resin.

The base and the amount of the base used can adopt one or more compounds selected from the group consisting of the basic compound and the fluoride mentioned above, and the amount of the compound(s) used. Preferably, one or more selected from the group consisting of potassium hydroxide, calcium hydroxide, barium hydroxide, and tetraethylammonium hydroxide can be used as the base.

The reaction conditions etc. or the reaction solvent etc. for use in the polycondensation reaction, can adopt those mentioned above.

After the completion of reaction, an ion-exchange resin having a sulfo group as an ion group is preferably used as the cation-exchange resin to remove the base.

For example, a styrenic (styrene-divinylbenzene copolymer) or acrylic resin having a matrix structure generally used can be used as the cation-exchange resin. The cation-exchange resin may be any of a strongly acidic cation-exchange resin having a sulfo group as an ion group and a weakly acidic cation-exchange resin having a carboxy group as an ion group. Various forms such as granular, fibrous, and membrane forms can be used as the form of the cation-exchange resin. Commercially available products can be suitably used as these cation-exchange resins.

Among others, a strongly acidic cation-exchange resin having a sulfo group as an ion group is preferably used.

Examples of the commercially available strongly acidic cation-exchange resin include: Amberlite® 15, Amberlite® 200, Amberlite® 200C, Amberlite® 200CT, Amberlite® 252, Amberlite® 1200 H, Amberlite® IR120B, Amberlite® IR120 H, Amberlite® IR122 Na, Amberlite® IR124, Amberlite® IRC50, Amberlite® IRC86, Amberlite® IRN77, Amberlite® IRP-64, Amberlite® IRP-69, Amberlite® CG-50, Amberlite® CG-120, Amberjet® 1020, Amberjet® 1024, Amberjet® 1060, Amberjet® 1200, Amberjet® 1220, Amberlyst® 15, Amberlyst® 15DRY, Amberlyst® 15JWET, Amberlyst® 16, Amberlyst® 16WET, Amberlyst® 3 IWET, Amberlyst® 35WET, Amberlyst® 36, Dowex® 50Wx2, Dowex® 50Wx4, Dowex® 50Wx8, Dowex® DR-2030, Dowex® DR-G8, Dowex® HCR-W2, Dowex® 650C UPW, Dowex® G-26, Dowex® 88, Dowex® M-31, Dowex® N-406, Dowex® Monosphere® 650C, Dowex® Monosphere® 88, Dowex® Monosphere® M-31, Dowex® Monosphere® 99K/320, Dowex® Monosphere® 99K/350, Dowex® Monosphere® 99Ca/320, Dowex Marathon® MSC, and Dowex Marathon® C [all manufactured by The Dow Chemical Company]; Diaion® EXC04, Diaion® HPK25, Diaion® PK208, Diaion® PK212, Diaion® PK216, Diaion® PK220, Diaion® PK228L, Diaion® RCP160M, Diaion® SK1B, Diaion® SK1BS, Diaion® SK104, Diaion® SK110, Diaion® SK112, Diaion® SK116, Diaion® UBK510L, and Diaion® UBK555 [all manufactured by Mitsubishi Chemical Corp.]; and Lewatit® MonoPlus S100 and Lewatit® MonoPlus SP 12 [both manufactured by Lanxess AG].

Examples of the commercially available weakly acidic cation-exchange resin include: Amberlite® CG-50, Amberlite® FPC3500, Amberlite® IRC50, Amberlite® IRC76, Amberlite® IRC86, Amberlite® IRP-64, and Dowex® MAC-3 [all manufactured by The Dow Chemical Company]; and Diaion® CWK30/S, Diaion® WK10, Diaion® WK11, Diaion® WK40, Diaion® WK100, and Diaion® WTO1S [all manufactured by Mitsubishi Chemical Corp.].

The polycondensation compound (polysiloxane) obtained through the reaction as mentioned above has a weight-average molecular weight Mw of 500 to 100,000, preferably 500 to 30,000, and a degree of distribution: Mw (weight-average molecular weight)/Mn (number-average molecular weight) of 1.0 to 10, measured on the basis of polystyrene by GPC.

The polysiloxane is a compound having at least a siloxane unit of $[X(Ar^1)SiO]$, for example, a compound having a cross-linked structure having at least siloxane units of $[X(Ar^1)SiO]$ and $[Ar^2SiO_{3/2}]$.

EXAMPLES

Hereinafter, the present invention will be described more specifically with reference to Examples. However, the present invention is not limited by Examples given below.

In Examples, apparatuses and conditions used in the preparation of samples and the analysis of physical properties are as follows.

(1) Spin coater
Apparatus: Cee® 200X manufactured by Brewer Science, Inc.
(2) UV exposure
Apparatus: batch-type UV irradiation apparatus (high-pressure mercury lamp 2 kW x 1) manufactured by Eye Graphics Co., Ltd.
(3) $^1$H NMR spectrum
Apparatus: AVANCE III HD manufactured by Bruker Corp.
Measurement frequency: 500 MHz
Solvent: $CDCl_3$
Internal standard: tetramethylsilane ($\delta$=0.00 ppm)
(4) Gel permeation chromatography (GPC)
Apparatus: Prominence® GPC system manufactured by Shimadzu Corp.
Column: Shodex® GPC KF-804L and GPC KF-803L manufactured by Showa Denko K.K.
Column temperature: 40° C.
Solvent: tetrahydrofuran
Detector: RI
Calibration curve: standard polystyrene
(5) Transmittance
Apparatus: ultraviolet-visible and near-infrared spectrophotometer V-670 manufactured by JASCO Corp.
Reference: quartz
(6) Refractive index $n_d$ and Abbe number $v_d$
Apparatus: multiple angle-of-incidence spectroscopic ellipsometer VASE manufactured by J. A. Woollam Co., Inc.
Measurement temperature: room temperature (approximately 23° C.)
Abbreviations are as defined below.
PheTMS: trimethoxy(9-phenanthryl)silane
SPDMS: dimethoxy(phenyl)(4-vinylphenyl)silane
SPeDMS: dimethoxy(phenanthren-9-yl)(4-vinylphenyl)silane
STMS: trimethoxy(4-vinylphenyl)silane [Shin-Etsu Silicone® KBM-1403 manufactured by Shin-Etsu Chemical Co., Ltd.]
TMOS: tetramethoxysilane [manufactured by Tokyo Chemical Industry Co., Ltd.]
TEAH: aqueous solution containing 35% by mass of tetraethylammonium hydroxide [manufactured by Sigma Aldrich Co. LLC]
I184: 1-hydroxy cyclohexyl phenyl ketone [IRGACURE® 184 manufactured by BASF SE]
PGMEA: propylene glycol monomethyl ether acetate
THF: tetrahydrofuran

[Production Example 1] Production of trimethoxy(9-phenanthryl)silane (PheTMS)

A 500 mL reaction flask equipped with a condenser was charged with 10.4 g (0.43 mol) of magnesium turnings [manufactured by Kanto Chemical Co., Inc.], and the air in the flask was purged with nitrogen using a nitrogen balloon. A mixture of 100.3 g (0.39 mol) of 9-bromophenanthrene [manufactured by Tokyo Chemical Industry Co., Ltd.] and 346 g of THF was added dropwise thereto at room temperature (approximately 23° C.) over 1 hour, and the mixture was further stirred for 30 minutes to prepare a Grignard reagent.

A 1 L reaction flask was charged with 178.0 g (1.17 mol) of TMOS and 346 g of THF, and the air in the flask was purged with nitrogen using a nitrogen balloon. The Grignard reagent was added dropwise thereto at room temperature (approximately 23° C.) over 30 minutes, and the mixture was further stirred for 2 hours. From this reaction mixture, THF was distilled off under reduced pressure using an evaporator. Soluble matter was dissolved by the addition of 1,000 g of hexane to the obtained residue. Then, insoluble matter was filtered off. To this insoluble matter, 500 g of hexane was added again, and insoluble matter was filtered off in the same way as above. The respective filtrates were mixed, and hexane was distilled off under reduced pressure using an evaporator to obtain a crude product. The crude product was distilled under reduced pressure (1 mmHg, 120 to 150° C.) and then recrystallized over 389 g of methanol to obtain 74.6 g (yield: 64%) of PheTMS of interest.

[Example 1] Production of Dimethoxy (Phenanthren-9-Yl)(4-Vinylphenyl)Silane (SPeDMS)

A 1 L reaction flask equipped with a condenser was charged with 15.7 g (0.65 mol) of magnesium turnings [manufactured by Kanto Chemical Co., Inc.], and the air in the flask was purged with nitrogen using a nitrogen balloon. A mixture of 151.2 g (0.58 mol) of 9-bromophenanthrene [manufactured by Tokyo Chemical Industry Co., Ltd.] and 518 g of THF was added dropwise thereto at room temperature (approximately 23° C.) over 1 hour, and the mixture was further stirred for 1 hour to prepare a Grignard reagent.

A 2 L reaction flask was charged with 131.9 g (0.58 mol) of STMS and 259 g of THF, and the air in the flask was purged with nitrogen using a nitrogen balloon. The Grignard reagent was added dropwise thereto under reflux (approximately 66° C.) over 30 minutes, and the mixture was further refluxed for 24 hours. From this reaction mixture, THF was distilled off under reduced pressure using an evaporator. Soluble matter was dissolved by the addition of 1,000 g of hexane to the obtained residue and subsequent reflux for 1 hour. Then, insoluble matter was filtered off. To this insoluble matter, 750 g of hexane was added again, and soluble matter was dissolved in the same way as above. Then, insoluble matter was filtered off. The respective filtrates were mixed, and hexane was distilled off under reduced pressure using an evaporator to obtain a crude product. The crude product was recrystallized over 150 g of hexane to obtain 102.4 g (yield: 47%) of SPeDMS of interest.

The $^1$H NMR spectrum of the obtained compound is shown in FIG. 1.

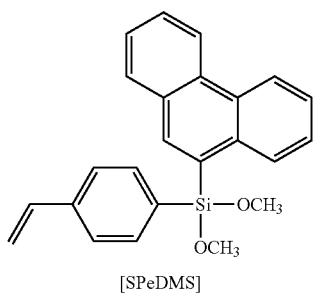 [SMILES: C=Cc1ccc([Si](OC)(OC)c2cc3ccccc3c3ccccc23)cc1]

[SPeDMS]

[Example 2] Production of Reactive Polysiloxane 1 (PStPe)

A 50 mL reaction flask equipped with a condenser was charged with 1.36 g (3.23 mmol) of TEAH and 12 g of THF, and the air in the flask was purged with nitrogen using a nitrogen balloon. A mixture of 29.9 g (80.7 mmol) of SPeDMS produced according to Example 1 and 24 g of THF was added dropwise thereto at room temperature (approximately 23° C.) over 10 minutes, and the mixture was stirred at 40° C. for 16 hours. This mixture was cooled to room temperature (approximately 23° C.). Subsequently, to this reaction mixture, 6.0 g of a cation-exchange resin [Amberlyst® 15JWET manufactured by The Dow Chemical Company] washed in advance with THF, and 1.2 g of a filter aid [KC Flock W-100GK manufactured by Nippon Paper Industries Co., Ltd.] were added, and the reaction was terminated by stirring for 1 hour. Then, the cation-exchange resin and the filter aid were filtered through a membrane filter having a pore size of 0.5 μm and further washed off with 30 g of ethyl acetate. This filtrate and the washes were combined and added to 897 g of methanol to precipitate a polymer. This precipitate was filtered and dried to obtain 18.9 g of reactive polysiloxane 1 (hereinafter, also abbreviated to PStPe) of interest.

The obtained compound had a weight-average molecular weight Mw of 610 and a degree of distribution: Mw (weight-average molecular weight)/Mn (number-average molecular weight) of 1.2 measured on the basis of polystyrene by GPC.

[Example 3] Production of Reactive Polysiloxane 2 (XPe55)

A 50 mL reaction flask equipped with a condenser was charged with 0.90 g (2.14 mmol) of TEAH, 0.86 g (47.7 mmol) of ion-exchange water, and 7 g of THF, and the air in the flask was purged with nitrogen using a nitrogen balloon. A mixture of 9.9 g (26.8 mmol) of SPeDMS produced according to Example 1, 8.0 g (26.8 mmol) of PheTMS produced according to Production Example 1, and 14 g of THF was added dropwise thereto at room temperature (approximately 23° C.) over 10 minutes, and the mixture was stirred at 40° C. for 16 hours. This mixture was cooled to room temperature (approximately 23° C.). Subsequently, to this reaction mixture, 3.6 g of a cation-exchange resin [Amberlyst® 15JWET manufactured by The Dow Chemical Company] washed in advance with THF, and 0.72 g of a filter aid [KC Flock W-100GK manufactured by Nippon Paper Industries Co., Ltd.] were added, and the reaction was terminated by stirring for 1 hour. Then, the cation-exchange resin and the filter aid were filtered through a membrane filter having a pore size of 0.5 μm and further washed off with 18 g of ethyl acetate. This filtrate and the washes were combined and added to 538 g of methanol to precipitate a polymer. This precipitate was filtered and dried to obtain 14.8 g of reactive polysiloxane 2 (hereinafter, also abbreviated to XPe55) of interest.

The obtained compound had a weight-average molecular weight Mw of 1,000 and a degree of distribution: Mw/Mn of 1.0 measured on the basis of polystyrene by GPC.

[Example 4] Production of Reactive Polysiloxane 3 (XPe46)

A 100 mL reaction flask equipped with a condenser was charged with 1.50 g (3.57 mmol) of TEAH, 1.43 g (79.5 mmol) of ion-exchange water, and 12 g of THF, and the air in the flask was purged with nitrogen using a nitrogen balloon. A mixture of 13.2 g (35.6 mmol) of SPeDMS produced according to Example 1, 16.0 g (53.6 mmol) of PheTMS produced according to Production Example 1, and 23 g of THF was added dropwise thereto at room temperature (approximately 23° C.) over 10 minutes, and the mixture was stirred at 40° C. for 16 hours. This mixture was cooled to room temperature (approximately 23° C.). Subsequently, to this reaction mixture, 5.9 g of a cation-exchange resin [Amberlyst® 15JWET manufactured by The Dow Chemical Company] washed in advance with THF, and 1.2 g of a filter aid [KC Flock W-100GK manufactured by Nippon Paper Industries Co., Ltd.] were added, and the reaction was terminated by stirring for 1 hour. Then, the cation-exchange resin and the filter aid were filtered through a membrane filter having a pore size of 0.5 m and further washed off with 29 g of ethyl acetate. This filtrate and the washes were combined and added to 877 g of methanol to precipitate a polymer. This precipitate was filtered and dried to obtain 23.7 g of reactive polysiloxane 3 (hereinafter, also abbreviated to XPe46) of interest.

The obtained compound had a weight-average molecular weight Mw of 1,100 and a degree of distribution: Mw/Mn of 1.0 measured on the basis of polystyrene by GPC.

[Comparative Example 1] Production of Dimethoxy(Phenyl)(4-Vinylphenyl)Silane (SPDMS)

A 500 mL reaction flask equipped with a condenser was charged with 10.2 g (0.42 mol) of magnesium turnings [manufactured by Kanto Chemical Co., Inc.], and the air in the flask was purged with nitrogen using a nitrogen balloon. A mixture of 60.0 g (0.38 mol) of bromobenzene [manufactured by Tokyo Chemical Industry Co., Ltd.] and 340 g of THF was added dropwise thereto at room temperature (approximately 23° C.) over 1 hour, and the mixture was further stirred for 1 hour to prepare a Grignard reagent.

A 1 L reaction flask was charged with 85.7 g (0.38 mol) of STMS and 170 g of THF, and the air in the flask was purged with nitrogen using a nitrogen balloon. The Grignard reagent was added dropwise thereto at room temperature (approximately 23° C.) over 30 minutes, and the mixture was further stirred for 2 hours. From this reaction mixture, THF was distilled off under reduced pressure using an evaporator. Soluble matter was dissolved by the addition of 600 g of hexane to the obtained residue. Then, insoluble matter was filtered off. To this insoluble matter, 300 g of hexane was added again, and insoluble matter was filtered off in the same way as above. The respective filtrates were mixed, and hexane was distilled off under reduced pressure using an evaporator to obtain a crude product. The crude product was distilled off under reduced pressure (I mmHg, 140 to 150° C.) to obtain 50.4 g (yield: 49%) of SPDMS of interest.

Figure 2:
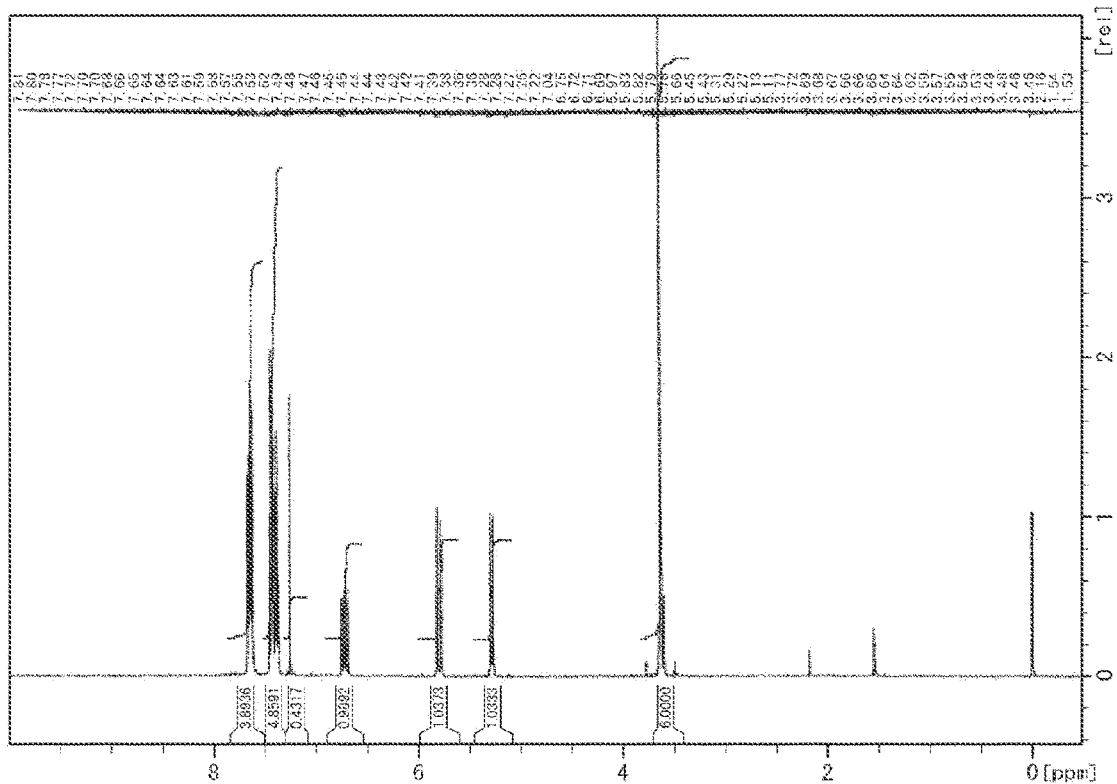
FIG. 2 is a diagram showing the $^1H$ NMR spectrum of dimethoxy(phenyl)(4-vinylphenyl)silane obtained in Comparative Example 1.

The $^1$H NMR spectrum of the obtained compound is shown in FIG. 2.

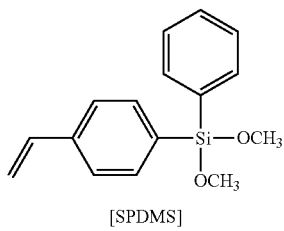 [SMILES: C=Cc1ccc([Si](OC)(OC)c2ccccc2)cc1]

[SPDMS]

[Comparative Example 2] Production of Reactive Polysiloxane 4 (PStPh)

A 50 mL reaction flask equipped with a condenser was charged with 0.50 g (1.18 mmol) of TEAH and 3 g of THF, and the air in the flask was purged with nitrogen using a nitrogen balloon. A mixture of 8.0 g (29.6 mmol) of SPDMS produced according to Comparative Example 1 and 6 g of THF was added dropwise thereto at room temperature (approximately 23° C.) over 10 minutes, and the mixture was stirred at 40° C. for 16 hours. This mixture was cooled to room temperature (approximately 23° C.). Subsequently, to this reaction mixture, 1.6 g of a cation-exchange resin [Amberlyst®15JWET manufactured by The Dow Chemical Company] washed in advance with THF, and 0.32 g of a filter aid [KC Flock W-100GK manufactured by Nippon Paper Industries Co., Ltd.] were added, and the reaction was terminated by stirring for 1 hour. Then, the cation-exchange resin and the filter aid were filtered through a membrane filter having a pore size of 0.5 μm and further washed off with 8 g of ethyl acetate. This filtrate and the washes were mixed and concentrated to obtain 5.9 g of reactive polysiloxane 4 (hereinafter, also abbreviated to PStPh) of interest.

The obtained compound had a weight-average molecular weight Mw of 1,800 and a degree of distribution: Mw/Mn of 1.4 measured on the basis of polystyrene by GPC.

[Evaluation of Optical Properties of Reactive Polysiloxane]

Three parts by mass of each reactive polysiloxane produced in Examples 2 to 4 and Comparative Example 2, 0.03 parts by mass of I184, and 7 parts by mass of PGMEA were mixed. This solution was filtered through a PTFE syringe filter having a pore size of 0.2 μm to obtain varnish having a solid concentration of 30% by mass.

A quartz substrate was spin-coated (1,500 rpm×30 sec) with each varnish, which was then dried by heating on a hot plate of 100° C. for 1 minute. This coating was exposed to UV at 20 mW/cm$^2$ for 150 seconds in a nitrogen atmosphere and further heated on a hot plate of 150° C. for 20 minutes to prepare a cured film having a film thickness of 1.5 μm. The minimum transmittance at a wavelength of 400 to 800 nm of the obtained cured film was measured. The results are shown in Table 1.

Each cured film was prepared in the same way as above except that the quartz substrate was changed to a silicon wafer. The refractive index $n_d$ at a wavelength of 588 nm (d ray) of the obtained cured film was measured. The results are also shown in Table 1.

TABLE 1

| Example/ Comparative Example | Reactive polysiloxane | Transmittance [%] | Refractive index $n_d$ | Abbe number $v_d$ |
|---|---|---|---|---|
| Example 2 | PStPe | 90.9 | 1.700 | 17.8 |
| Example 3 | XPe55 | 93.5 | 1.756 | 17.4 |
| Example 4 | XPe46 | 94.0 | 1.761 | 17.0 |
| Comparative Example 2 | PStPh | 91.6 | 1.613 | 25.0 |

As shown in Table 1, the cured products obtained from the polymers of the silane compounds of the present invention shown in Examples 2 to 4 were confirmed to have high transparency of 90% or more in terms of transmittance and to exhibit a high refractive index of 1.70 or more.

On the other hand, the cured product obtained from the polymer of the silane compound having no specific structure (Comparative Example 2) was confirmed to have a refractive index as low as 1.613, though having a high transmittance. These results demonstrated the superiority of the present invention.

The invention claimed is:
1. A polysiloxane being a polycondensation product of a polymerizable silane compound of formula [1]:

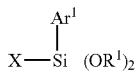 [1]

wherein
   X is a phenyl group having at least one substituent having a polymerizable double bond, a naphthyl group having at least one substituent having a polymerizable double bond, a biphenyl group having at least one substituent having a polymerizable double bond, or a phenanthryl group having at least one group having a polymerizable double bond,
   $Ar^1$ is a phenanthryl group, and
   $R^1$ is a methyl group, an ethyl group, or an isopropyl group.

2. A polysiloxane being a copolycondensation product of a polymerizable silane compound of formula [1]:

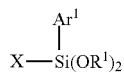 [1]

wherein
   X is a phenyl group having at least one substituent having a polymerizable double bond, a naphthyl group having at least one substituent having a polymerizable double bond, a biphenyl group having at least one substituent having a polymerizable double bond, or a phenanthryl group having at least one group having a polymerizable double bond,
   $Ar^1$ is a phenanthryl group, and
   $R^1$ is a methyl group, an ethyl group, or an isopropyl group
with an alkoxysilane compound different from the polymerizable silane compound.

3. A polysiloxane being a copolycondensation product of a polymerizable silane compound of formula [1]:

 [1]

wherein
   X is a phenyl group having at least one substituent having a polymerizable double bond, a naphthyl group having at least one substituent having a polymerizable double bond, a biphenyl group having at least one substituent having a polymerizable double bond, or a phenanthryl group having at least one group having a polymerizable double bond,
   $Ar^1$ is a phenanthryl group, and
   $R^1$ is a methyl group, an ethyl group, or an isopropyl group
with an aromatic silane compound of formula [2]:

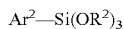 [2]

wherein
   $Ar^2$ is a condensed polycyclic hydrocarbon group (optionally substituted with a $C_{1-6}$ alkyl group), or a hydrocarbon ring assembly group in which two or more aromatic rings are directly bonded through a single bond (optionally substituted with a $C_{1-6}$ alkyl group), and
   $R^2$ is a methyl group, an ethyl group, or an isopropyl group.

4. A polysiloxane being a copolycondensation product of (1) a polymerizable silane compound of formula [1]:

 [1]

wherein
   X is a phenyl group having at least one substituent having a polymerizable double bond, a naphthyl group having at least one substituent having a polymerizable double bond, a biphenyl group having at least one substituent having a polymerizable double bond, or a phenanthryl group having at least one group having a polymerizable double bond,
   $Ar^1$ is a condensed polycyclic hydrocarbon group (optionally substituted with a $C_{1-6}$ alkyl group), or a hydrocarbon ring assembly group in which two or more aromatic rings are directly bonded through a single bond (optionally substituted with a $C_{1-6}$ alkyl group), and
   $R^1$ is a methyl group, an ethyl group, or an isopropyl group, with (2) an aromatic silane compound of formula [2]:

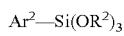 [2]

wherein
   $Ar^2$ is a phenanthryl group, and
   $R^2$ is a methyl group, an ethyl group, or an isopropyl group.

* * * * *